(12) United States Patent
Matyas, Jr. et al.

(10) Patent No.: US 7,519,178 B1
(45) Date of Patent: Apr. 14, 2009

(54) METHOD, SYSTEM AND APPARATUS FOR ENSURING A UNIFORM DISTRIBUTION IN KEY GENERATION

(75) Inventors: Stephen Michael Matyas, Jr., Manassas, VA (US); Allen Roginsky, Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 403 days.

(21) Appl. No.: 09/256,796

(22) Filed: Feb. 24, 1999

(51) Int. Cl.
*H04L 9/00* (2006.01)
*H04K 1/00* (2006.01)
*G06F 7/58* (2006.01)
*G06F 15/16* (2006.01)

(52) U.S. Cl. .................. 380/44; 380/255; 380/262; 380/28; 713/150; 713/153; 713/155; 713/156; 713/168; 713/171; 713/176; 726/4; 726/12

(58) Field of Classification Search .............. 380/44, 380/262
See application file for complete search history.

(56) References Cited

U.S. PATENT DOCUMENTS

| 4,691,291 | A | * | 9/1987 | Wolfram ............... 364/717 |
| 4,944,007 | A | * | 7/1990 | Austin ................. 380/21 |
| 5,146,500 | A | * | 9/1992 | Maurer ................ 380/30 |
| 5,381,481 | A | * | 1/1995 | Gammie et al. ........ 380/49 |
| 5,606,617 | A | * | 2/1997 | Brands ................ 380/30 |
| 5,675,649 | A | * | 10/1997 | Brennan et al. ....... 380/21 |
| 5,748,740 | A | * | 5/1998 | Curry et al. .......... 380/25 |
| 5,796,833 | A | * | 8/1998 | Chen et al. .......... 380/25 |
| 5,850,444 | A | * | 12/1998 | Rune ................. 380/21 |

OTHER PUBLICATIONS

Menezes, Alfred; van Oorschot, Paul; Vanstone, Scott, Handbook of Applied Cryptography, 1997, pp. 170-175.*
Elgar, Eric, VARs bring sens of security to Internet, Oct. 1997, Computer Reseller News, pp. 173 and 190.*
Anonymous, Distributed Team Collaborates to Solve Secret-Key Challenge, Sep. 2002, PR Newswire, pp. 1-2.*
Sayir, Jossy, Cryptographic Randomness, 2003, ftw, pp. 1-17.*

* cited by examiner

*Primary Examiner*—Christopher A Revak
*Assistant Examiner*—Aravind K Moorthy
(74) *Attorney, Agent, or Firm*—Winstead P.C.; Robert E. Straight, II

(57) ABSTRACT

A method, system and apparatus are described for ensuring a uniform random distribution of keys generated for cryptography. These generated keys, are depicted utilizing a trusted third party, or Certification Authority (CA) in the generation of a reliable seed to be used in the generation of prime numbers used in public key cryptography. The inclusion of the trusted third party allows for an independent third party to police against first party attacks on the security of the system without increasing the overhead of the system significantly.

9 Claims, 5 Drawing Sheets

User 150     151 Certification Authority 101 generates x
103 compute y
      105 send y →
          generates z 107
          compute w 109
          signs w 111
          increase counter 113
     ← 115 send z & signed w
117 compute Xseed
119 compute w
121 verify signature on w
123 generate keys

User 450

401 retrieve Xseed, Sigw

403 Compute Xseed'

405 compute w1 and w2 from Xseed and Xseed'

407 verify that w1 or w2 corresponds to Sigw

Fig. 4

User 550

501 retrieve Xseed, Sigw

503 Compute w from Xseed 505 verify that w corresponds to Sigw

Fig. 5

METHOD, SYSTEM AND APPARATUS FOR ENSURING A UNIFORM DISTRIBUTION IN KEY GENERATION

RELATED APPLICATIONS

This application is related to copending application entitled "Method, System and Apparatus for Improved Reliability in Generating Secret Keys", application Ser. No. 09/108,795 filed July, 1998 and assigned to assignee of the present invention.

BACKGROUND OF THE INVENTION

Cryptography is a security mechanism for protecting information from unintended disclosure by transforming the information into a form that is unreadable to humans, and unreadable to machines that are not specially adapted to reversing the transformation back to the original information content. The cryptographic transformation can be performed on data that is to be transmitted electronically, such as an electronic mail message, and is equally useful for data that is to be securely stored, such as the account records for customers of a bank or credit company.

In addition to preventing unintended disclosure, cryptography also provides a mechanism for preventing unauthorized alteration of data transmitted or stored in electronic form. After the data has been transformed cryptographically, an unauthorized person is unlikely to be able to determine how to alter the data, because the specific data portion of interest cannot be recognized. Even if the unauthorized user knew the position of the data portion within a data file or message, this position may have been changed by the transformation, preventing the unauthorized person from merely substituting data in place. If an alteration to the transformed data is made by the unauthorized user despite the foregoing difficulties, the fact of the alteration will be readily detectable, so that the data will be considered untrustworthy and not relied upon. This detection occurs when the transformation is reversed; the encrypted date will not reverse to its original contents properly if it has been altered. The same principle prevents unauthorized addition of characters to the data, and deletion of characters from the data, once it has been transformed.

The transformation process performed on the original data is referred to as "encryption." The process of reversing the transformation, to restore the original data, is referred to as "decryption." The terms "encipher" and "decipher" are also used to describe these processes, respectively. A mechanism that can both encipher and decipher is referred to as a "cipher." Data encryption systems are well known in the data processing art. In general, such systems operate by performing an encryption on a plaintext input block, using an encryption key, to produce a ciphertext output block. "Plaintext" refers to the fact that the data is in plain, unencrypted form. "Ciphertext" refers to the fact that the data is in enciphered or encrypted form. The receiver of an encrypted message performs a corresponding decryption operation, using a decryption key, to recover the original plaintext block.

A cipher to be used in a computer system can be implemented in hardware, in software, or in a combination of hardware and software. Hardware chips are available that implement various ciphers. Software algorithms are known in the art as well.

Encryption systems fall into two general categories. Symmetric (or secret key) encryption systems use the same secret key for both encrypting and decrypting messages. An example of a symmetric encryption system is the Data Encryption Standard (DES) system, which is a United States federal standard described in a National Institute of Standards and Technology Federal Information Processing Standard (FIPS Pub 46). In the DES system, a key having 56 independently specified bits is used to convert 64-bit plaintext blocks to 64-bit ciphertext blocks, or vice versa.

Asymmetric (or public key) encryption systems, on the other hand, use two different keys that are not feasibly derivable from one another, one for encryption and another for decryption. A person wishing to receive messages generates a pair of corresponding encryption and decryption keys. The encryption key is made public, while the corresponding decryption key is kept secret. Anyone wishing to communicate with the receiver may encrypt a message using the receiver's public key. Only the receiver may decrypt the message, since only he has the private key. One of the best-known asymmetric encryption systems is the RSA encryption system, named for its originators Rivest, Shamir, and Adleman, and described in U.S. Pat. No. 4,405,829 to Rivest et al., "Cryptographic Communications System and Method."

A public key system is frequently used to encrypt and transmit secret keys for use with a secret key system. A public key system is also used to provide for digital signatures, in which the sender encrypts a signature message using his private key. Because the signature message can only be decrypted with the sender's public key, the recipient can use the sender's public key to confirm that the signature message originated with the sender.

A commonplace method, for both signature generation and signature verification, is to reduce the message M (to be signed) by means of a cryptographic hash function, in which case, the hash of the message, H(M), is signed instead of the message M itself. Signing H(M) requires only one encryption operation whereas signing M may require several encryption operations, depending on the length of M.

One of the serious concerns regarding most public key cryptography systems is that, since some public keys can be weaker (although very few, some are easier to "break" than others), an ill intentioned party may deliberately generate such a weaker key to be used to encrypt certain valuable information or to electronically sign a document. This party, if it finds it useful for its purposes, may claim that since the "weak" key was used for a particular transaction, an attacker could decrypt the message or forge a signature. This cheating user can then require the annulment of the transaction or other actions based on such a weakness in the key. For example, if a key used in the Elliptic Curve cryptography system is such that the private key, usually denoted as d, is short, then the encryption can be solved much faster than in the general case. A danger is becoming even more apparent when one is dealing with cryptography systems based on a popular and widely accepted RSA algorithm.

Such a danger exists only when the cheating party (often referred to as "the first party" in the situations described above since the party is responsible for the generation of the key which constitutes the first step in the encryption or in a signing protocol) puts a significant effort into generating such "bad" keys since the probability of obtaining one at random is extremely small. The purpose of this invention is to develop a protocol which will ultimately stop these efforts of a first party attacker and thus assure all parties in the quality of the public keys and in the non-repudiation of the signatures generated.

The approach herein is described with respect to the RSA signature algorithm although it is equally applicable to use in other public key cryptography systems requiring the generation of primes.

A method for computing digital signatures with the RSA algorithm is described in ANSI Standard X9.31-1998 Digital Signatures Using Reversible Public Key Cryptography For The Financial Services Industry (rDSA). ANSI Standard X9.31 defines procedures for:
  i. Choosing the public verification exponent, e,
  ii. Generating the private prime factors, p and q, and public modulus, n=pq, and
  iii. Calculating the private signature exponent, d.

The procedure for signing a message M (signature production) consists of the following steps: M is hashed using a cryptographic hash function H to produce a hash value H(M). H(M) is then encapsulated within a data structure IR, a representative element RR is computed from IR, and RR is raised to the power d modulo n. The signature $\Sigma$ is either the result or its complement to n, whichever is smaller. That is, $\Sigma=\min\{RR^d \bmod n, n-(RR^d \bmod n)\}$. The signature $\Sigma$ is exactly one bit less in length than the length of the modulus n. The message and signature (M, $\Sigma$) are then sent to the receiver for verification.

The procedure for verifying a signature (signature verification) consists of the following steps: The verifier treats the message and signature as (M', $\Sigma$') until the signature verification is successful, and it is proven that M=M' and $\Sigma=\Sigma$'. The signature $\Sigma$' is raised to the power e mode n in order to obtain the intermediate integer RR'. That is, $RR'=(\Sigma')^e \bmod n$. The intermediate integer IR' is then computed from RR' as a function of the least significant (right most) bits of RR'. A sanity check is then performed on IR', and if this step succeeds, the value of H(M)' is then recovered from IR'. Finally, a hash is computed on the received message M', and the computed value of H(M') is compared for equality with the recovered value of H(M)'. The verification process succeeds if the two values are equal and it fails if the two values are not equal.

The public exponent is a positive integer e, where $2 \leq e \leq 2^{k-160}$, and k is the length of the modulus n in bits. The public exponent may be selected as a fixed value or generated as a random value. When e is odd, the digital signature algorithm is called RSA. When e is even, the digital signature algorithm is called Rabin-Williams. Common fixed values for e are 2, 3, 17, and $2^{16}+1=65,537$.

The public modulus, n, is the product of two distinct positive primes, p and q (i.e., n=pq).

The private prime factors, p and q, are secretly and randomly selected by each signing entity. The private prime factors must satisfy several conditions, as follows:
1. Constraints on p and q relative to e are:
  If e is odd, then e shall be relatively prime to both p−1 and q−1.
  If e is even, then p shall be congruent to 3 mod 8, q shall be congruent to 7 mod 8, and e shall be relatively prime to both (p−1)/2 and (q−1)/2.
2. The numbers p±1 and q±1 shall have large prime factors greater than $2^{100}$ and less then $2^{120}$, such that:
  p−1 has a large prime factor denoted by $p_1$
  p+1 has a large prime factor denoted by $p_2$
  q−1 has a large prime factor denoted by $q_1$
  q+1 has a large prime factor denoted by $q_2$
3. The private prime factor p is the first discovered prime greater than a random number Xp, where $(\sqrt{2})(2^{511+128s}) \leq X_p \leq (2^{512+128s}-1)$, and meets the criteria in Nos. 1 and 2 above, and the private prime factor q is the first discovered prime greater than a random number $X_q$, where $(\sqrt{2})(2^{511+128s}) \leq X_q \leq (2^{512+128s}-1)$, and meets the criteria in Nos. 1 and 2 above. s=0, 1, 2, etc. is an integer used to fix the block size. Once selected, the value of s remains constant for the duration of the prime generation procedure.
4. The random numbers Xp and Xq must be different by at least one of their first most significant 100 bits, i.e., $|X_p - X_q| > 2^{412+128s}$. For example, if s=4, so that $X_p$ and $X_q$ are 1024-bit random numbers, then the most significant bit of $X_p$ and the most significant bit of $X_q$ must be "1" and the next most significant 99 bits of $X_p$ and the next most significant 99 bits of $X_q$ must be different in at least 1 bit. Likewise, the private prime factors, p and q, must also satisfy the relationship $|p-q| > 2^{412+128s}$.

The private signature exponent, d, is a positive integer such that $d > 2^{512+128s}$. That is, the length of d must be at least half the length of the modulus n. d is calculated as follows:
  If e is odd, then $d=e^{-1} \bmod (LCM (p-1, q-1))$
  If e is even, then $d=e^{-1} \bmod (½ LCM (p-1, q-1))$ where LCM denotes "Least Common Multiple." In the rare event that $d \leq 2^{512+128s}$, then the key generation process is repeated with new seeds for $X_{q1}$, $X_{q2}$, and $X_q$. The random numbers $X_{q1}$ and $X_{q2}$ are defined below.

The candidates for the private prime factors, p and q, are constructed using the large prime factors, $p_1$, $p_2$, $q_1$, and $q_2$, and the Chinese Remainder Theorem (see A. Menezes, P. C. Van Oorschot, and S. Vanstone, Handbook of Applied Cryptography, CRC Press, 1997.)

The large prime factors $p_1$, $p_2$, $q_1$, and $q_2$, are generated from four generated random numbers $X_{p1}$, $X_{p2}$, $X_{q1}$ and $X_{q2}$. The random numbers are chosen from an interval $[2^{100+a}, 2^{101+a}-1]$ where "a" satisfies $0 \leq a \leq 20$. For example, if a=19, then the random numbers are randomly selected from the interval $[2^{119}, 2^{120}-1]$, in which case the random numbers each have 120 bits, where the most significant bit of each generated number $X_{p1}$, $X_{p2}$, $X_{q1}$ and $X_{q2}$ is "1." If a pseudo random number generator (PRNG) is used, it is recommended that the four random numbers should be generated from 4 separate input seeds.

The $p_1$, $p_2$, $q_1$, and $q_2$, are the first primes greater than their respective random X values ($X_{p1}$, $X_{p2}$, $X_{q1}$ and $X_{q2}$) and such that they are mutually prime-with the public exponent e. That is, e must not contain a factor equal to $p_1$, $p_2$, $q_1$, or $q_2$.

The procedure to generate the private prime factor p is as follows:

A. Select a value of s, e.g., s=4.

B. Generate a random number $X_p$ such that $(\sqrt{2})(2^{512+128s}) \leq X_p \leq (2^{512+128s}-1)$.

C. Compute the intermediate values:
  $R_p = (p_2^{-1} \bmod p_1)p_2 - (p_1^{-1} \bmod p_2)p_1$. If $R_p < 0$, then replace $R_p$ by
  $R_p + p_1 p_2$.
  $Y_0 = X_p + (R_p - X_p \bmod p_1 p_2)$.
  If e is odd, do the following:

1. If $Y_0 < X_p$, replace $Y_0$ by $(Y_0 + p_1 p_2)$. $Y_0$ is the least positive integer greater than $X_p$ congruent to $(1 \bmod p_1)$ and $(-1 \bmod p_2)$. This ensures that $p_1$ is a large prime factor of $(Y_0 - 1)$ and $p_2$ is a large prime factor of $(Y_0 + 1)$.

2. Search the integer sequence $\{Y_0, Y_1 = Y_0 + (p_1 p_2), Y_2 = Y_0 + 2(p_1 p_2), Y_3 = Y_0 + 3(p_1 p_2), \ldots, Y_1 = Y_0 + I(p_1 p_2)\}$ in order, where I is an integer $\geq 0$, until finding a $Y_i$ such that
  $Y_i$ is prime and
  $GCD(Y_i - 1, e) = 1$ where GCD is Greatest Common Divisor, in which case, $p=Y_i$.

If e is even, do the following:

1. Replace $Y_0$ with $Y_0+kp_1p_2$, where $0 \leq k \leq 7$ is the smallest non-negative integer that makes $Y_0+kp_1p_2 \equiv 3 \mod 8$. If $Y_0 < X_p$, replace $Y_0$ by $(Y_0+8p_1p_2)$. $Y_0$ is the least positive integer greater than $X_p$ congruent to ($1 \mod p_1$) and ($-1 \mod p_2$) and ($3 \mod 8$).

2. Search the integer sequence.

$\{Y_0, \ Y_1=Y_0+(8p_1p_2), \ Y_2=Y_0+2(8p_1p_2), \ Y_3=Y_0+3(8p_2p_2), \ldots, Y_i=Y_0+I(8p_1p_2)\}$ in order, where I is an integer $\geq 0$, until finding a $Y_i$ such that
  $Y_i$ is prime and
  GCD $((Y_i-1)/2, e) = 1$, and $Y_i \equiv 3 \mod 8$ in which case, $p=Y_i$.

The procedure to generate the private prime factor q is as follows:

A. The s used to generate q is the same s used to generate p, e.g., s=4.

B. Generate a random number $X_q$ such that $(\sqrt{2})(2^{511+128s}) \leq X_q \leq (2^{512+128s}-1)$.

C. Compute the intermediate values:
  $R_q = (q_2^{-1} \mod q_1) \ q_2 - (q_1^{-1} \mod q_2) \ q_1$. If $R_q < 0$, then replace $R_q$ by
  $R_q + q_1q_2$.
  $Y_0 = X_q + (R_q - X_q \mod q_1q_2)$.

If e is odd, do the following:

1. If $Y_0 < X_q$, replace $Y_0$ by $(Y_0+q_1q_2)$. $Y_0$ is the least positive integer greater than $X_q$ congruent to ($1 \mod q_1$) and ($-1 \mod q_2$). This ensures that $q_1$ is a large prime factor of $(Y_0-1)$ and $q_2$ is a large prime factor of $(Y_0+1)$.

2. Search the integer sequence $\{Y_0, Y_1=Y_0+(q_1q_2), Y_2=Y_0+2(q_1q_2), Y_3=Y_0+3(q_1q_2), \ldots, Y_i Y_0+I(q_1q_2)\}$ in order, where I is an integer $\geq 0$, until finding a $Y_i$ such that
  $Y_i$ is prime and
  GCD $(Y_i-1, e) = 1$ in which case, $q=Y_i$.

If e is even, do the following:

1. Replace $Y_0$ with $Y_0+kq_1q_2$, where $0 \leq k \leq 7$ is the smallest non-negative integer that makes $Y_0+kq_1q_2 \equiv 7 \mod 8$. If $Y_0 < X_p$, replace $Y_0$ by $(Y_0+8q_1q_2)$. $Y_0$ is the least positive integer greater than $X_q$ congruent to ($1 \mod q_1$) and ($-1 \mod q_2$) and ($7 \mod 8$).

2. Search the integer sequence.

$\{Y_0, \ Y_1=Y_0+(8q_1q_2), \ Y_2=Y_0+2(8q_1q_2), \ Y_3=Y_0+3(8q_1q_2), \ldots, Y_i=Y_0+I(8q_1q_2)\}$ in order, where I is an integer $\geq 0$, until finding a $Y_i$ such that
  $Y_i$ is prime and
  GCD $((Y_i-1)/2, e) = 1$, and $Y_i \equiv 7 \mod 8$ in which case, $q=Y_i$.

As mentioned above, the value $|X_p-X_q|$ must be $> 2^{412+128s}$. If not, then another $X_q$ is generated, and a new value of q is computed. This step is repeated until the constraint is satisfied. Likewise, the generated values of p and q must satisfy the relation $|p-q| > 2^{412+128s}$.

NOTE: It is very unlikely that the test on $|X_p-X_q|$ would succeed and the test on $|p-q|$ would fail.

NOTE: According to the X9.31 Standard, if a pseudo random number generator is used to generate random numbers, then separate seeds should be used to generate $X_p$ and $X_q$.

Altogether there are six random numbers $X_i$ needed in the generation of the private prime factors, p and q, namely $X_p$, $X_{p1}$, $X_{p2}$, $X_q$, $X_{q1}$ and $X_{q2}$. These random numbers are generated by either a true noise hardware randomizer (RNG) or via a pseudo random generator (PRNG).

The random numbers $X_i$ are generated differently depending on whether or not the process of generating the private prime factors (p and q) requires the capability to be audited later by an independent third party.

In the case where no audit is required, the outputs of the RNG and the PRNG are used directly as the random numbers $X_i$. In the case where audit is required, the outputs of the RNG and the PRNG are used as intermediate values, called SEED (upper case) values, and these SEED values are then hashed to produce the random numbers $X_i$. That is, when an audit capability is required, an extra hashing step is used in the generation of the random numbers $X_i$.

The PRNG itself makes use of an input seed (lower case), which is different from the generated SEED values. Thus, when an audit capability is required and a PRNG is used, a random seed (lower case) is input to the PRNG and a SEED (upper case) is output from the PRNG.

To illustrate the process, suppose that one wishes to generate a 1024 bit random number $X_i$ using SHA-1 as the hash algorithm—see ANSI Standard X9.30-1996, Public Key Cryptography Using Irreversible Algorithms for the Financial Services Industry, Part 2: The Secure Hash Algorithm—1 (SHA-1). Since the output hash value from SHA-1 is 160 bits, the optimal method for generating an $X_i$ of 1024 bits is to generate 7 160-bit SEED values, denoted SEED1 through SEED7, hash each of these SEED values with SHA-1 to produce 7 corresponding 160-bit hash values, denoted hash1 through hash7, and then extract 1024 bits from the available 1120 bits, e.g., by concatenating the values hash1 through hash6 together with 64 bits taken from hash7.

The method for generating a 120-bit $X_i$ is more straightforward. In this case, a single 160-bit SEED is generated and then hashed, and 120 bits are taken from the resulting hash value. The concatenation of the 7 SEED values used in generating each of $X_p$ and $X_q$ are denoted $X_p$SEED and $X_q$SEED, respectively. The single SEED values used in generating $X_{p1}$, $X_{p2}$, $X_{q1}$ and $X_{q2}$ are denoted $X_{p1}$SEED, $X_{p2}$SEED, $X_{q1}$SEED, and $X_{q2}$SEED, respectively.

In order to allow for audit, the SEED values $X_p$SEED, $X_q$SEED, $X_{p1}$SEED, $X_{p2}$SEED, $X_{q1}$SEED, and $X_{q2}$SEED must be saved, and they must be available in case an audit is required. The SEED values must also be kept secret. It is recommended that the SEED values ($X_p$SEED, $X_q$SEED, $X_{p1}$SEED, $X_{p2}$SEED, $X_{q1}$SEED, and $X_{q2}$SEED) be retained with the private key as evidence that the primes were generated in an arbitrary manner.

The procedure for auditing the generation procedure (i.e., the generation of the private prime factors, p and q) is a follows:

1. The inputs to the audit procedure are the public exponent e, the public modulus n, and the six secret SEED values $X_p$SEED, $X_q$SEED, $X_{p1}$SEED, $X_{p2}$SEED, $X_{q1}$SEED, and $X_{q2}$SEED.

2. The SEED values $X_p$SEED, $X_q$SEED, $X_{p1}$SEED, $X_{p2}$SEED, $X_{q1}$SEED, and $X_{q2}$SEED are hashed, and the random number $X_p$, $X_q$, $X_{p1}$, $X_{p2}$, $X_{q1}$ and $X_{q2}$, are produced from the generated hash values, respectively, using the same procedure that was used to generate the private prime factors, p and q.

3. The private prime factors, p and q, and the private signature exponent d are re-generated using the same procedure used originally to generate p, q, and d.
4. The generated p and q are multiplied together and the resulting product is compared for equality with the input modulus n. If the two values are equal, then the prime factors were generated according to the rules prescribed in the ANSI X9.31 Standard. Otherwise, the prime factors were not generated according to the rules prescribed in the ANSI X9.31 Standard.

The audit procedure is specifically designed to defend against a so-called First Party Attack. In a first party attack, a user purposely generates a large number of candidate prime numbers until one is found that has some mathematical weakness. Later, the user repudiates one or more of his generated signatures by showing that a weakness exists in one of his primes and claiming that the weakness was discovered and exploited by an adversary. In such a case, the user (or First Party) does not follow the prescribed ANSI X9.31 private prime factor generation procedure, but instead uses a different method to purposely construct primes that have a desired weakness. Even if one generates a pair of strong primes as required by the ANSI X9.31 standard, it is still possible that the primes are "bad", that is, that the primes have such undesirable properties as p/q is near the ratio of two small integers or |p−q| does not have a large prime factor or that GCD(p−1, q−1) is small. While these situations are highly unlikely to occur, it is possible that a persistent attacker may find such primes and use them to deliberately generate a "bad" public key.

But, the ANSI X9.31 method of prime number generation—hashing SEED values to generate the needed random numbers, $X_i$—prevents an insider from starting with an intentionally constructed "bad prime" and working backwards' to derive the SEED(s) needed to generate the prime. Whereas, it might be possible to start with a constructed "bad prime" and invert the steps to obtain the corresponding random number $X_i$ (needed to produce the "bad prime"), it is not possible to invert the hash function to determine the required input SEED(s) that will produce $X_i$. In effect, the method of using hash values forces the user to generate his primes using a "forward process." This means that the only way a "bad prime" can be produced is by pure chance—by repeatedly selecting different starting SEED values and generating primes from these SEED values until a "bad prime" happens to be produced. However, the probability of such a chance event is very small, in fact small enough so that (for practical purposes) a user will never be able to find a "bad prime" using trial and error.

The procedure for generating the private prime factors (p and q) and the private signature exponent d can be specified in terms of the following abbreviated steps:

1. Generate $X_{p1}$SEED, and then generate $X_{p1}$ from $X_{p1}$SEED. This is a constructive step that cannot fail.
2. Generate $p_1$ from $X_{p1}$. This step is an iterative step in which candidate values of $p_1$ are generated from a single starting value $X_{p1}$, in a prescribed order, until a $p_1$ is found that satisfies a required primality test and a test involving the public verification exponent e. The step can potentially fail in the very unlikely event that the size of the generated $p_1$ (e.g., 121 bits) is greater than the size of the starting value $X_{p1}$ (e.g., 120 bits). If step 2 fails, then repeat steps 1 and 2; otherwise, continue with step 3.
3. Generate $X_{p2}$SEED, and then generate $X_{p2}$ from $X_{p2}$SEED. This is a constructive step that cannot fail.
4. Generate $p_2$ from $X_{p2}$. This step is an iterative step in which candidate values of $p_2$ are generated from a single starting value $X_{p2}$, in a prescribed order, until a $p_2$ is found that satisfies a required primality test and a test involving the public verification exponent e. The step can potentially fail in the very unlikely event that the size of the generated p2 (e.g., 121 bits) is greater than the size of the starting value $X_{p2}$ (e.g., 120 bits). If step 4 fails, then repeat steps 3 and 4; otherwise, continue with step 5.
5. Generate $X_p$SEED (e.g., consisting of 7 160-bit SEEDs), and then generate $X_p$ from $X_p$SEED. This step involves a test to ensure that $X_p$ falls within a specified range of allowed values. The step is repeated (possibly several times) until a suitable value of $X_p$ is found.
6. Generate p from $X_p$. This step is an iterative step in which candidate values of p are generated from a single starting value $X_p$, in a prescribed order, until a p is found that satisfies a required primality test and a test involving the public verification exponent e. The step can potentially fail in the extremely unlikely event that the size of the generated p (e.g., 1025 bits) is greater than the size of the starting value $X_p$ (e.g., 1024 bits). If step 6 fails, then repeat steps 5 and 6; otherwise, continue with step 7
7. Generate $X_{q1}$SEED, and then generate $X_{q1}$ from $X_{q1}$SEED. This is a constructive step that cannot fail.
8. Generate $q_1$ from $X_{q1}$. This step is an iterative step in which candidate values of $q_1$ are generated from a single starting value $X_{q1}$ in a prescribed order, until a $q_1$ is found that satisfies a required primality test and a test involving the public verification exponent e. The step can potentially fail in the very unlikely event that the size of the generated $q_1$ (e.g., 121 bits) is greater than the size of the starting value $X_{q1}$ (e.g., 120 bits). If step 8 fails, then repeat steps 7 and 8; otherwise, continue with step 9.
9. Generate $X_{q2}$SEED, and then generate $X_{q2}$ from $X_{q2}$SEED. This is a constructive step that cannot fail.
10. Generate $q_2$ from $X_{q2}$. This step is an iterative step in which candidate values of $q_2$ are generated from a single starting value $X_{q2}$, in a prescribed order, until a $q_2$ is found that satisfies a required primality test and a test involving the public verification exponent e. The step can potentially fail in the very unlikely event that the size of the generated q2 (e.g., 121 bits) is greater than the size of the starting value $X_{q2}$ (e.g., 120 bits). If step 10 fails, then repeat steps 9 and 10; otherwise, continue with step 11.
11. Generate $X_q$SEED (e.g., consisting of 7 160-bit SEEDs), and then generate $X_q$ from $X_q$SEED. This step involves a test to ensure that $X_q$ falls within a specified range of allowed values and that $|X_p - X_q|$ is greater than a specified value. The step is repeated (possibly several times) until a suitable value of $X_q$ is found.
12. Generate q from $X_q$. This step is an iterative step in which candidate values of q are generated from a single starting value $X_q$, in a prescribed order, until a q is found that satisfies a required primality test and a test involving the public verification exponent e and a test to ensure that |p−q| is greater than a specified value. The step can potentially fail in the extremely unlikely event that the size of the generated q (e.g., 1025 bits) is greater than the size of the starting value $X_q$ (e.g., 1024 bits). If step 12 fails, then repeat steps 11 and 12; otherwise, continue with step 13.
13. Generate the private signature exponent d from e, p and q. Then test d to ensure that it is smaller than a specified value. In the extremely rare event that the test on d fails, repeat steps 7 through 13; otherwise stop.

The ANSI X9.31 prescribed audit procedure has certain disadvantages.

1. For a modulus with 1024-bit primes, approximately 2880 bits of extra SEED values ($X_p$SEED, $X_q$SEED, $X_{p1}$SEED, $X_{p2}$SEED, $X_{q1}$SEED, and $X_{q2}$SEED) would need to be carried with each private key. This more than triples the number of secret bits that need to be carried in the "private key."

2. Although the ANSI X9.3 1 Standard recommends that the SEED values be retained with the private key, some implementers may object to this (e.g., when the key is stored on a smart card or when the key is input to a cryptographic function or cryptographic hardware to perform a cryptographic operation), and they may elect to retain the SEED values separately from the private key. But keeping the SEED values separate from the private key has even worse ramifications. In that case, the SEED values may become lost or damaged, in which case the audit function is crippled or rendered ineffective, and most likely the signature key is also rendered ineffective. The user must also protect the secrecy of the of the SEED values, since if the SEED values are discovered by an adversary, they can be easily used to generate the primes and private key, and hence to forge signatures. Storing the private key and SEED values in two different locations means that there are now two targets or points of attack for the adversary, not just one. Thus, when the audit feature is used, the honest user must take extra special steps to prevent the SEEDs from becoming lost or damaged and to protect the secrecy of the SEEDs. This places an extra burden on the user.

3. The SEED values are independent, and there is no apparent need for this. Consequently, it might be possible for an insider attacker to exploit this degree of independence to attack the procedure.

As noted above, though, it is possible to generate "bad" primes through chance or through repeated generation and testing. A significant problem with public key encryption is that some of the public keys might be weaker than others and therefore, if used, will give an attacker a greater chance of breaking the encryption and discovering the secret. For example, a prime number p used in the RSA encryption algorithm would be considered weak for the purposes of RSA encryption or signature generation if either p−1 or p+1 does not have any large prime divisors. Similarly, an elliptic curve encryption or signature generation will be subject to an attack if the value of the private key d is very small as compared to the size of the underlying finite field. See ANSI Standard X9.3 1-1998 *Digital Signatures Using Reversible Public Key Cryptography For the Financial Services Industry* (rDSA) and ANSI Standard X9.62-1998 *The Elliptic Curve Digital Signature Algorithm* for the details of these methods.

While the algorithm specified in this invention creates "strong" primes in the definitions of the ANSI Standard X9.31 (that is, p−1, p+1, q−1, and q+1 all have large prime factors and |p−q| is large), the present invention should alleviate a requirement that such be present since the probability of such occurrence at random is extremely low and by not allowing many repeated efforts to generate a pair of primes, imposing such restrictions becomes unnecessary.

OBJECTS OF THE INVENTION

It is an object of the present invention to provide an improved method, system and apparatus for the generation of cryptographic variables, including secret keys and secret prime numbers required in the generation of public and private keys used with a public key algorithm that ensures a uniform distribution of the generated cryptographic variables.

It is yet another object of the present invention to provide a method, system and apparatus for user-controlled generation of cryptographic variables, such as keys, that eliminates first party attacks wherein the user intentionally repeatedly invokes the generation procedure until a "bad" value, with some desired "bad" property, is produced while maintaining the uniform distribution of said cryptographic variables.

SUMMARY OF THE INVENTION

These and other objects of the invention are accomplished by the invention described herein. The present invention involves a method, system and apparatus for utilizing a trusted third party, namely a Certification Authority (CA) in the generation of a seed. The Certification Authority is already involved in cryptography and is a critical part of the public key infrastructure. Involving the Certification Authority in the prevention of a first party attack does not introduce a new entity and therefore does not significantly increase overhead. The method herein described improves upon the method described in the copending application entitled "Method, System and Apparatus for Improved Reliability in Generating Secret Keys" in that it ensures a uniform distribution of the cryptographic variables generated.

BRIEF DESCRIPTION OF THE DRAWINGS

FIG. 4 depicts the validation procedure for two of the described embodiments of the present invention.

FIG. 5 depicts the validation procedure for the embodiment of the present invention shown using the RSA public key.

DETAILED DESCRIPTION OF THE PREFERRED EMBODIMENT

The present invention will now be described in detail with respect to a preferred embodiment and the figures. This embodiment is not meant to limit or restrict the invention in any way but is meant as an example of how the invention may be implemented.

In the preferred embodiment a user provides information to a Certificate Authority who generates a signed value and provides the signed value back to the user. The Certificate Authority also maintains a count of repeated attempts to acquire signed values such that if a first party attack were to occur, the Certificate Authority would recognize the numerous repeated requests from the same user. The generation of the seed, Xseed, of the present invention is as follows:

Inputs:
L=the length, in bits, of a seed to be generated
$p_0$=a publicly known prime number of at least length L+2 bits
g=a publicly known generator used to secure communications between the user and the Certification Authority
H=a hash function
Pkca, Skca—the Certification Authority's public and private (secret) key pair used for signing
x=a secret value (of length L bits) generated by the user
z=a secret value (of length L bits) generated by the CA.

Output: Xseed=a seed to be used to generate keys for public encryption.

Figure 1:
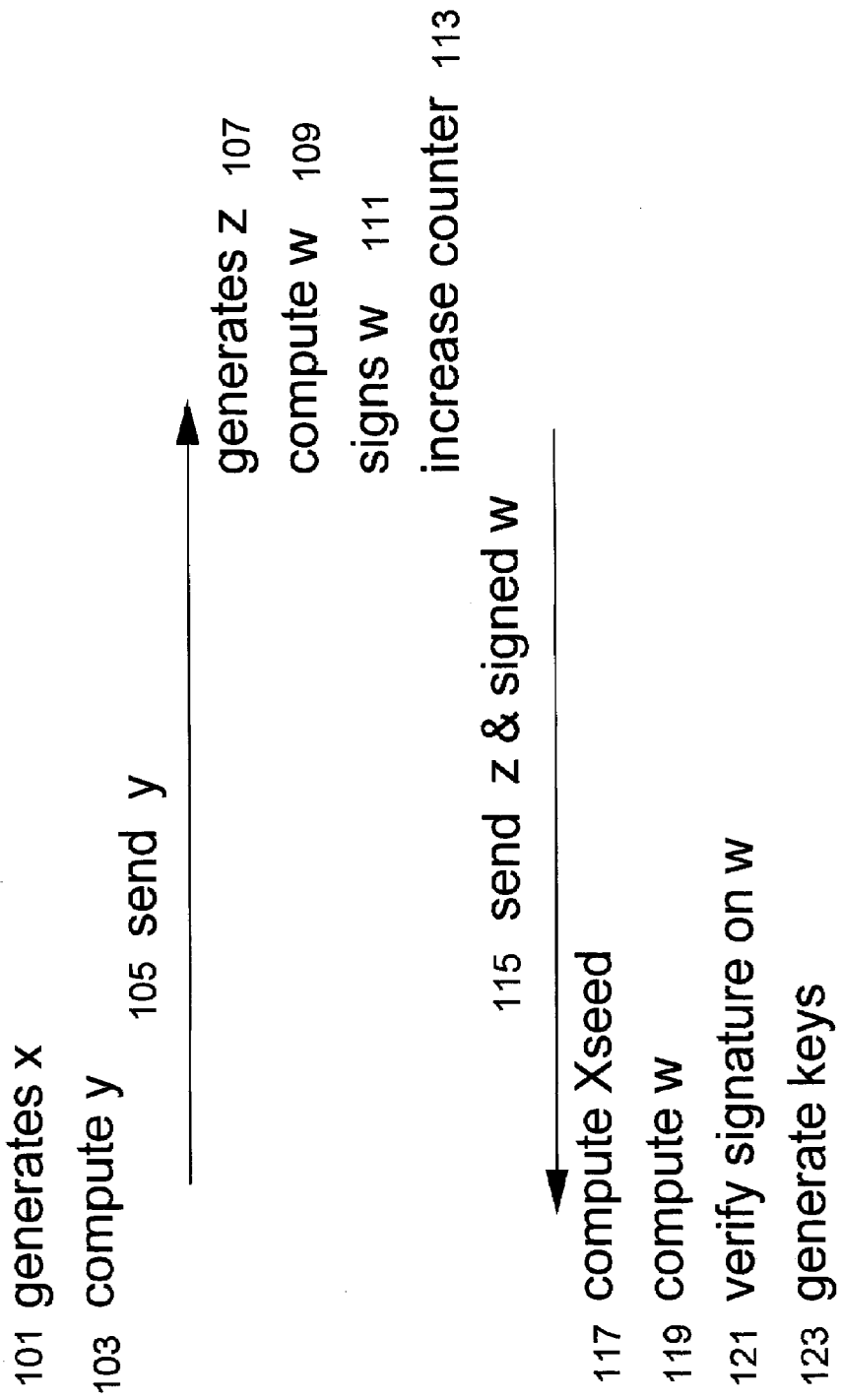
FIG. 1 depicts a logical overview of the present invention.
Figure 2:
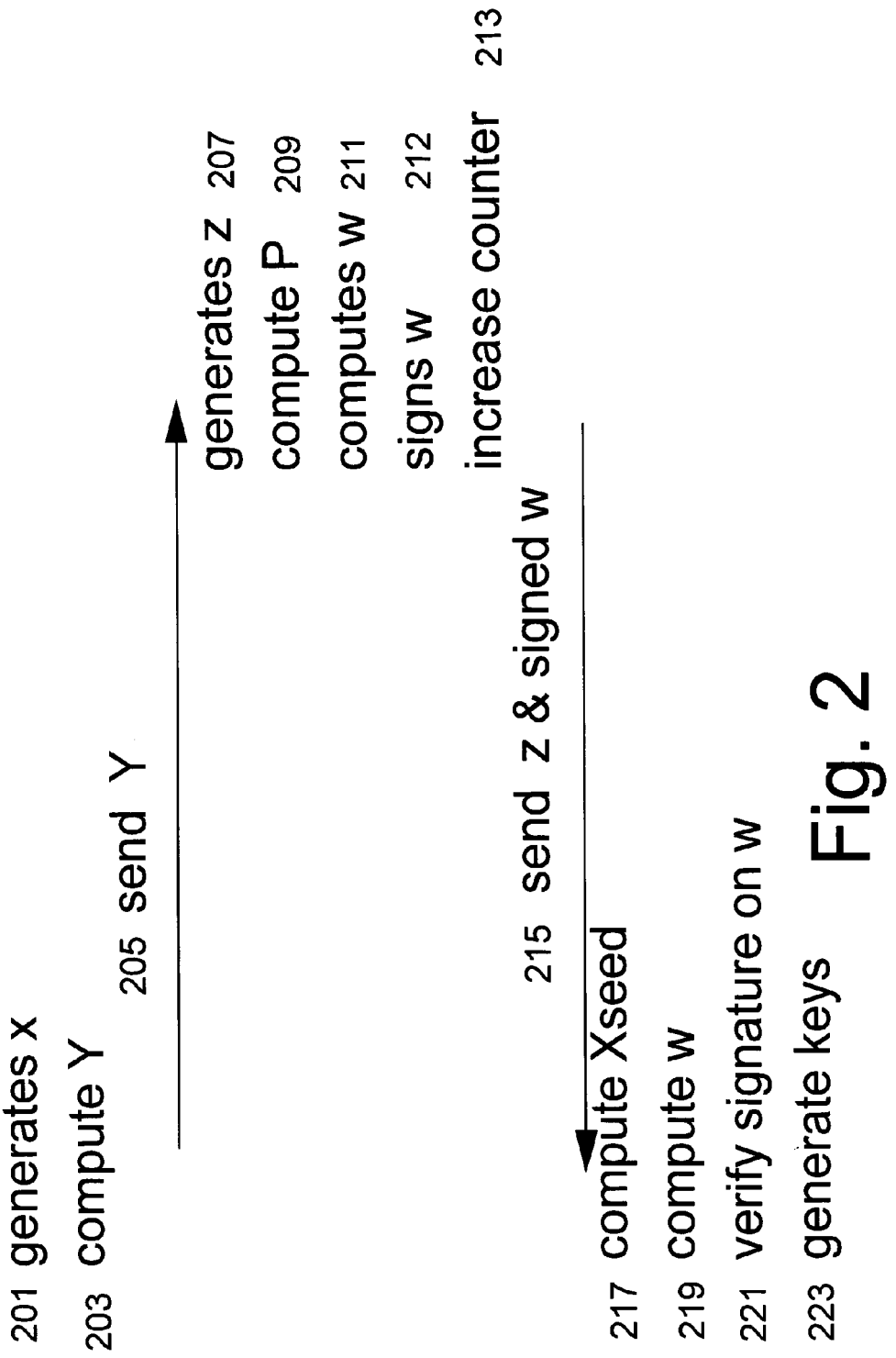
FIG. 2 depicts yet another embodiment of the present invention.

Referring to FIG. 1, first the user 150 randomly generates an integer x 101 of between 1 and $2^L-1$ (where L=the length of the seed to be generated). The user then computes y 103 where $y=g^x \pmod{p_0}$ and sends y 105 to the Certification Authority 151. The Certification Authority 151 then receives y from the user 150 and randomly generates an integer z 107 between 0 and $2^L-1$ and computes w 109 where $w=H(y*g \pmod{p_0}))$ and signs w 111 with its private (or secret) key SKca. This signed value is called Sigw. The Certification Authority next increments a counter 113 to track the number of times the user has asked for assistance in establishing seeds. This can be done per user or for the entire CA. If the count is larger than some reasonable threshold for a particular user (or for the entire CA if the counters are not kept per user) then the CA might suspect that a user is attempting a first party attack and the CA will send a warning to a system administrator.

At step 115, the Certification Authority sends z and the signed w (Sigw) to the user for use in generating primes. The user computes Xseed 117 to be $(x+z) \bmod 2^L$. The user next computes Xseed such that $Xseed=x+z \pmod{2^L}$. The values of Xseed are uniformly distributed over the set of integers between 0 and $2^L-1$ since z is drawn uniformly randomly from the set of integers between 0 and $2^L-1$. If Xseed does not satisfy the security requirement for its intended use then the user returns to the first step and retries. The user then computes w 119 where $w=H(g^{x+z} \pmod{p_0}))$ and verifies the signature on w 121 (Sigw) using the public verification key of the Certification Authority (PKca). This ensures the user that an audit can be passed.

The user now keeps Sigw and Xseed and proceeds to generate the public keys 123 using Xseed as a seed. If more than one seed is needed then a similar procedure can be used to generate each required seed.

The user can successfully pass an audit by proving that the proper procedure was followed by computing Pkca(Sigw) as shown in FIG. 4. This can be done by using the stored value Xseed 401 and the public values of y and $p_0$ to first compute $w1=H(g^{Xseed} \pmod{p_0}))$ and $w2=H(g^{Xseed'} \pmod{p_0}))$ 405, where $Xseed'=Xseed+2^L$ 403, then validating that either w1 or w2 is the desired w using the stored value Sigw and the public verification key of the Certification Authority, Pkca 407. If the signature is valid. then one knows that the user followed the rules and passes the audit.

Figure 3:
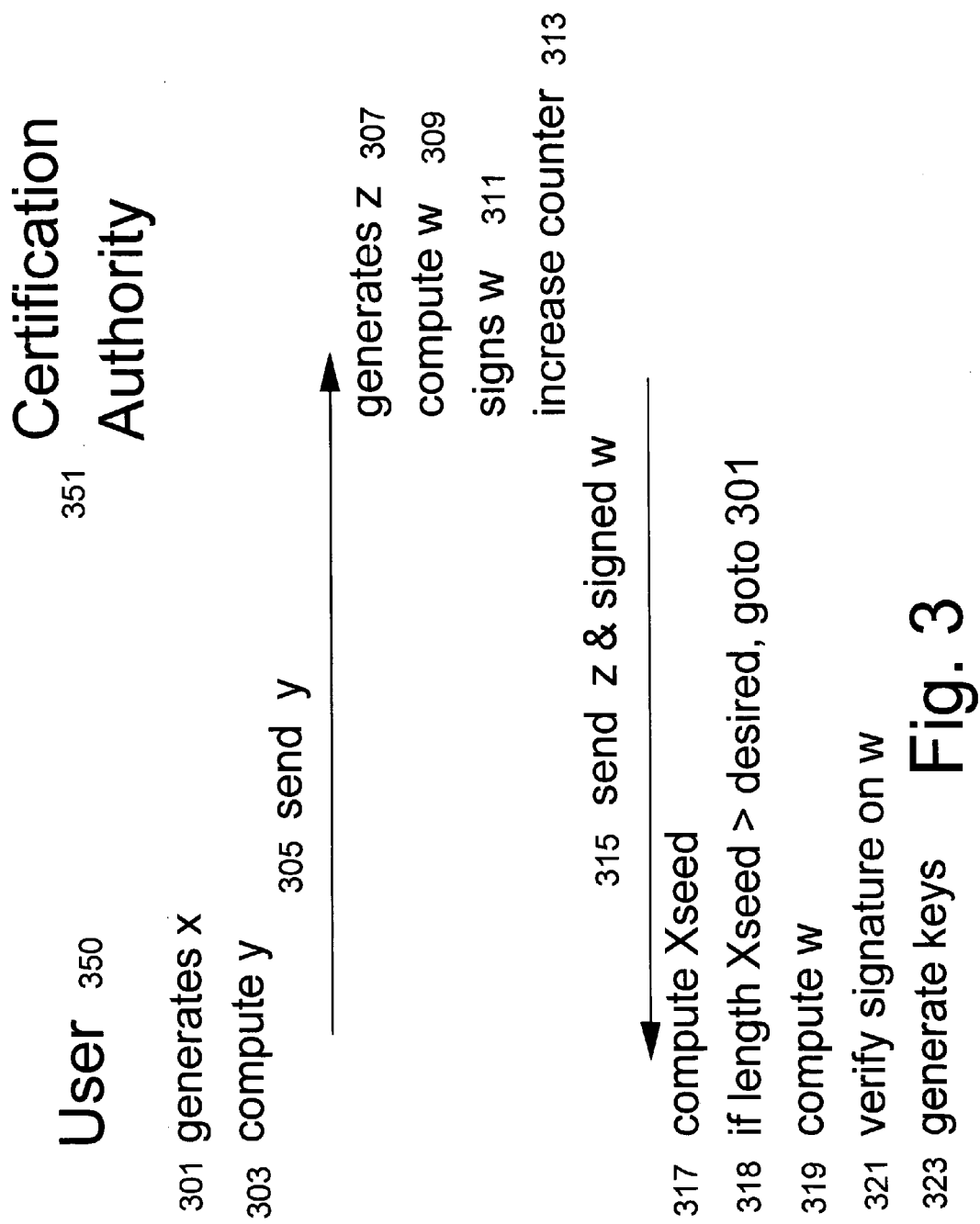
FIG. 3 depicts an embodiment of the present invention using an RSA public key.

A second embodiment of the present invention is depicted below and in FIG. 3. First the user randomly generates an integer x 301 between 1 and N−1 where N is a publicly known composite number of the length L+1 bits where L is the length in bits of a seed to be generated and N=p*q where p and q are large unknown primes and x is mutually prime with N. It should be noted that using this protocol, the size of the security parameter N is closely related to that of the seed to be generated. Next the user computes y 303 where $y=x^e \pmod{N}$ where e is an RSA public exponent. The user then sends y to the certification authority 305.

The certification authority randomly generates an integer z 307 between 1 and N−1, it then computes w 309 where $w=H(y*z^e \pmod{N}))$ where H is a hash function. The certification authority then signs w 311 using its private key. This signed value is called Sigw for ease of reading. Note that if z takes all integer values between 1 and N−1 then, since x is mutually prime with N, then $x*z \pmod{N}$ also takes all possible values between 1 and N−1. Each of these values will occur exactly once while z is changing between 1 and N−1, so the likelihood for $x*z \pmod{N}$ to take any given value is the same and is equal to 1/(N−1), hence resulting in a uniform distribution. Next the certification authority increases by 1 the count 313 for the number of times this user asked for assistance establishing the primes. If the count becomes unreasonably large (depending on the particular user or certification authority) the certification might suspect the user and stop responding to the user. Alternatively, as before, the certification authority might keep just one count for all of its users and, if the count becomes unreasonably large, the certification authority can suspend its operating until an investigation is performed. Next the certification authority sends z and Sigw to the user 315.

The user now computes Xseed 317 such that $Xseed=x*z \pmod{N}$. If $Xseed \geq 2^L$ then the user must retry using a new x. If the generated Xseed does not satisfy the security requirements for its intended use then the user must restart with; a new x 318. If the generated Xseed does satisfy the security requirements then the user computes w 319 such that $w=H((x*z)^e \pmod{N}))$ and the user verifies the signature on w (Sigw) 321 using the public verification key of the certification authority. The user keeps x, Sigw and Xseed. When the key generation process is complete, the user will destroy the z and x but keep Sigw and Xseed. There is no danger in exposing Sigw since it will not divulge information about Xseed. The user next proceeds to generate the public keys as needed using Xseed as a seed 323. If more than one seed is needed then a similar procedure can be used to generate each seed.

If, using the above described procedure, there is an audit, the procedure in FIG. 5 will be used where the user first retrieves Xseed and Sigw 501. The user then computes w 503 where $w=H((Xseed)^e \pmod{N}))$ and then validates it using Sigw and the public verification key of the certification authority 505.

A third embodiment can also be utilized in conjunction with the present invention. The third embodiment is based on the strength of the discrete logarithm problem for a group of points on an elliptic curve over a finite field. First, the user randomly generates an integer x 201 between 1 and $2^L-1$ where L is the length in bits of a seed to be generated. The user then computes a point Y 203, where Y=xG and G is a base point of order n on an elliptic curve E over a finite field Fq. The number of points on this curve is nh, where n is a large prime and h is a small cofactor. For additional information and background on the elliptic curve and cryptography see *Elliptic Curve Public Key Cryptosystems* by A. J. Menezes and published by Kluwer Academic Publishers, Fourth Printing, 1997.

The user next sends Y to the certification authority 205. The certification authority randomly generates an integer z 207 between 0 and $2^L-1$ (0 is acceptable in this situation since the value of z will not make it any easier to guess the value of x+z). The certification authority then computes a point P 209 where P=Y+zG on E. The coordinates of P are denoted $x_p$ and $y_p$. The certification authority then computes w 211 where $w=H(x_p)$ and signs w 212 using the certification authorities private key. This value is called Sigw. The certification authority increases the counter by 1 213. The counter allows for detection if someone is making an excessive number of requests. The certification authority then sends z and Sigw to the user 215. The user next computes Xseed such that $Xseed=x+z \pmod{2^L}$ 217. The values of Xseed are uniformly distributed over the set of integers between 0 and $2^L-1$ since z is drawn uniformly randomly from the set of integers between 0 and $2^L-1$. If Xseed does not satisfy the security requirement for its intended use then the user returns to the first step and retries. The user then computes w 219 where $w=H(x_p)$ and $x_p$ is the x-coordinate of the point (x+z)G on E. The user then verifies the signature on w (Sigw) 221 using the public verification key of the certification authority. This ensures that the user can pass an audit if such an audit were to be performed. The user keeps x, Sigw and Xseed. The user then proceeds to generate the public keys as needed 223 using Xseed. If more than one key is needed then a similar procedure can be used to generate each seed.

If, in the procedure above, there is an audit, the user will compute w1 and w2, the hash values of the x-coordinates of the points (Xseed)G and (Xseed+$2^L$)G, correspondingly, on E, and proceed as in the previously described processes.

Several variations of the above described preferred embodiment become obvious to one skilled in the art. Some of these variations will be detailed below.

In one variation, in addition to the steps described above, when the user sends a message to the certification authority requesting a certificate, the certificate request message contains the usual information needed to obtain a certificate, but also contains the additional information of w and Sigw. The certification authority processes the certificate request message as described above, but, in addition, the certification authority verifies the signature on w(Sigw) using the public verification key of the certification authority. This ensures that w is genuine. The certification authority then computes H(Sigw). The certification authority generates a certificate for the user which also incorporates H(Sigw). The generation of a certificate includes signing it with the certification authorities secret key. The certification authority sends the generated certificate to the user. The user then computes H(Sigw) using the copy of Sigw received from the certification authority. The user verifies the signature on the certificate using the public verification key of the certification authority. The user verifies that the value of H(Sigw) stored in the certificate is equal to the value of H(Sigw) computed by the user. If the certificate, including the value of H(Sigw) is valid, the user keeps Xseed and destroys x, z, Sigw and H(Sigw).

If the above alternative is used, the auditing procedure must be modified accordingly. First the user reveals Xseed. The auditor, who may be the certification authority, then computes w1 and w2 where w1=$H(g^{Xseed}(\mod p_0))$ and w2=$H(g^{Xseed'}(\mod p_0))$ and Xseed'=Xseed+$2^L$. The auditor then asks the certification authority to sign the computed w1 and w2 with its private signature key. The certification authority provides these signed values Sigw1 and Sigw2 to the auditor. The auditor computes H(Sigw1) and H(Sigw2). The auditor then validates the user's certificate using the public verification key of the certification authority and validates that the copy of H(Sigw) stored in the user's certificate is equal to one of the values H(Sigw1) or H(Sigw2) previously computed.

Yet another variation of the processes described would be to have the certification authority incorporate the value of w rather than H(Sigw) into the user's certificate.

What is claimed is:

1. A system for ensuring seeds for generating keys used in cryptography are uniformly distributed, said system comprising:
   a user computer;
   a certification authority, said certification authority having a public key and a private key wherein:
   said user computer randomly generates an integer x having the same number of bits as the desired length (L) of a seed value;
   said user computer calculates a value y using a publicly known prime and a publicly known generator used to secure communications between said user computer and said certification authority;
   said user computer sends y to said certification authority;
   said certification authority randomly generates an L bit integer, z, and computes a number w;
   said certification authority signs w with said private key of said certification authority;
   said certification authority sends z and said signed w to said user computer;
   said user computer computes Xseed such that Xseed is uniformly distributed over the set of integers between 0 and $2^L-1$;
   said user computer computes w; and,
   said user computer verifies the signature on said signed w sent by the certification authority using said certification authorities public key.

2. A system for ensuring seeds for generating keys used in cryptography are uniformly distributed, said system comprising:
   a user computer;
   a certification authority, said certification authority having a public key and a private key wherein:
   said user computer uniformly randomly generates an integer x having a value between 1 and one less than a public RSA modulus N;
   said user computer calculates a value y where y is a function of x, an RSA public exponent, e, and the RSA public modulus N;
   said user computer sends y to said certification authority;
   said certification authority randomly generates an integer, z, between 1 and N−1, and computes a number w;
   said certification authority signs w with said private key of said certification authority;
   said certification authority sends z and said signed w to said user computer;
   said user computer computes Xseed such that Xseed is uniformly distributed over the set of integers between 1 and $2^L-1$;
   said user computer computes w; and,
   said user computer verifies the signature on said signed w sent by the certification authority using said certification authorities public key.

3. A system for ensuring seeds for generating keys used in cryptography are uniformly distributed, said system comprising:
   a user computer;
   a certification authority, said certification authority having a public key and a private key wherein:
   said user computer randomly generates an integer x having the same length as the desired length (L) of a seed value;
   said user computer calculates a value y where y is a function of x and of a base point on an elliptic curve;
   said user computer sends y to said certification authority;
   said certification authority randomly generates an L bit integer, z, and computes a number w where w is a function of one or more coordinates of a point on an elliptic curve;
   said certification authority signs w with said private key of said certification authority;
   said certification authority sends z and said signed w to said user computer;
   said user computer computes Xseed such that Xseed is uniformly distributed over the set of integers between 0 and $0^L-1$;
   said user computer computes w; and,
   said user computer verifies the signature on said signed w sent by the certification authority using said certification authorities public key.

4. A system for ensuring seeds for generating keys used in cryptography are uniformly distributed, said system comprising:
   a user computer;

a certification authority, said certification authority having a public key and a private key wherein:

said user computer randomly generates an integer x having the same number of bits as the desired length (L) of a seed value;

said user computer calculates a value y using a publicly known prime and a publicly known generator used to secure communications between said user computer and said certification authority;

said user computer sends y to said certification authority;

said certification authority randomly generates an L bit integer, z, and computes a number w;

said certification authority signs w with said private key of said certification authority;

said certification authority sends z and said signed w to said user computer;

said user computer computes Xseed such that Xseed is uniformly distributed over the set of integers between 0 and $2^L-1$;

said user computer computes w; and said user computer verifies the signature on said signed w sent by the certification authority using said certification authorities public key;

wherein w is equal to the equation:

$$w=H(y*g^z(\bmod po))$$

wherein H is a hash function;

wherein g is a publicly known generator; and wherein po is a publicly known prime number of at least length L+2 bits.

5. A system for ensuring seeds for generating keys used in cryptography are uniformly distributed, said system comprising:

a user computer;

a certification authority, said certification authority having a public key and a private key wherein:

said user computer uniformly randomly generates an integer x having a value between 1 and one less than a public RSA modulus N;

said user computer calculates a value y where y is a function of x, an RSA public exponent, e, and the RSA public modulus N;

said user computer sends y to said certification authority;

said certification authority randomly generates an integer, z, between 1 and N−1, and computes a number w;

said certification authority signs w with said private key of said certification authority;

said certification authority sends z and said signed w to said user computer;

said user computer computes Xseed such that Xseed is uniformly distributed over the set of integers between 1 and $2^L-1$;

said user computer computes w; and said user computer verifies the signature on said signed w sent by the certification authority using said certification authorities public key;

wherein w is equal to the equation:

$$w=H(y*z^e(\bmod N))$$

wherein H is a hash function.

6. A system for ensuring seeds for generating keys used in cryptography are uniformly distributed, said system comprising:

a user computer;

a certification authority, said certification authority having a public key and a private key wherein:

said user computer randomly generates an integer x having the same length as the desired length (L) of a seed value;

said user computer calculates a value y where y is a function of x and of a base point on an elliptic curve;

said user computer sends y to said certification authority;

said certification authority randomly generates an L bit integer, z, and computes a number w where w is a function of one or more coordinates of a point on an elliptic curve;

said certification authority signs w with said private key of said certification authority;

said certification authority sends z and said signed w to said user computer;

said user computer computes Xseed such that Xseed is uniformly distributed over the set of integers between 0 and $2^L-1$;

said user computer computes w; and said user computer verifies the signature on said signed w sent by the certification authority using said certification authorities public key;

wherein w is equal to the equation:

$$w=H(x_p)$$

wherein H is a hash function;

wherein $x_p$ is an x-coordinate of a point on said elliptic curve.

7. A system for ensuring seeds for generating keys used in cryptography are uniformly distributed, said system comprising:

a user computer;

a certification authority, said certification authority having a public key and a private key wherein:

said user computer randomly generates an integer x having the same number of bits as the desired length (L) of a seed value;

said user computer calculates a value y using a publicly known prime and a publicly known generator used to secure communications between said user computer and said certification authority;

said user computer sends y to said certification authority;

said certification authority randomly generates an L bit integer, z, and computes a number w;

said certification authority signs w with said private key of said certification authority;

said certification authority sends z and said signed w to said user computer;

said user computer computes Xseed such that Xseed is uniformly distributed over the set of integers between 0 and $2^L-1$;

said user computer computes w; and said user computer verifies the signature on said signed w sent by the certification authority using said certification authorities public key;

wherein Xseed is a function of x, z and said length (L).

8. A system for ensuring seeds for generating keys used in cryptography are uniformly distributed, said system comprising:

a user computer;

a certification authority, said certification authority having a public key and a private key wherein:

said user computer uniformly randomly generates an integer x having a value between 1 and one less than a public RSA modulus N;

said user computer calculates a value y where y is a function of x, an RSA public exponent, e, and the RSA public modulus N;

said user computer sends y to said certification authority;

said certification authority randomly generates an integer, z, between 1 and N−1, and computes a number w;

said certification authority signs w with said private key of said certification authority;

said certification authority sends z and said signed w to said user computer;

said user computer computes Xseed such that Xseed is uniformly distributed over the set of integers between 1 and $2^L-1$;

said user computer computes w; and said user computer verifies the signature on said signed w sent by the certification authority using said certification authorities public key;

wherein Xseed is equal to the equation:

$$X\text{seed} = x * z \pmod{N}.$$

9. A system for ensuring seeds for generating keys used in cryptography are uniformly distributed, said system comprising:

a user computer;

a certification authority, said certification authority having a public key and a private key wherein:

said user computer randomly generates an integer x having the same length as the desired length (L) of a seed value;

said user computer calculates a value y where y is a function of x and of a base point on an elliptic curve;

said user computer sends y to said certification authority;

said certification authority randomly generates an L bit integer, z, and computes a number w where w is a function of one or more coordinates of a point on an elliptic curve;

said certification authority signs w with said private key of said certification authority;

said certification authority sends z and said signed w to said user computer;

said user computer computes Xseed such that Xseed is uniformly distributed over the set of integers between 0 and $2^L-1$;

said user computer computes w; and said user computer verifies the signature on said signed w sent by the certification authority using said certification authorities public key;

wherein Xseed is a function of x, z and said length (L).

* * * * *